(12) United States Patent
Lee et al.

(10) Patent No.: US 7,729,313 B2
(45) Date of Patent: Jun. 1, 2010

(54) HANDOVER METHOD FOR OFDM WIRELESS COMMUNICATION SYSTEM

(75) Inventors: Sang-Hoon Lee, Seoul (KR);
Sung-Hyun Cho, Seoul (KR);
Sang-Boh Yun, Seongnam-si (KR)

(73) Assignees: Samsung Electronics Co., Ltd. (KR);
Yonsei University (KR)

( * ) Notice: Subject to any disclaimer, the term of this patent is extended or adjusted under 35 U.S.C. 154(b) by 1381 days.

(21) Appl. No.: 11/156,507

(22) Filed: Jun. 20, 2005

(65) Prior Publication Data
US 2006/0007888 A1    Jan. 12, 2006

(30) Foreign Application Priority Data
Jun. 18, 2004    (KR)    ............... 10-2004-0045758

(51) Int. Cl.
*H04W 4/00* (2009.01)
(52) U.S. Cl. .................... 370/331; 370/332
(58) Field of Classification Search ............ None
See application file for complete search history.

(56) References Cited

U.S. PATENT DOCUMENTS

| 6,047,187 | A | 4/2000 | Haartsen | |
|---|---|---|---|---|
| 7,280,467 | B2* | 10/2007 | Smee et al. | 370/208 |
| 7,437,164 | B2* | 10/2008 | Agrawal et al. | 455/446 |
| 2002/0169008 | A1* | 11/2002 | Hiben et al. | 455/574 |
| 2004/0101063 | A1* | 5/2004 | Sipila | 375/267 |
| 2004/0228267 | A1* | 11/2004 | Agrawal et al. | 370/203 |
| 2006/0098570 | A1* | 5/2006 | Hadad | 370/210 |
| 2007/0049279 | A1* | 3/2007 | Van Rensburg et al. | 455/442 |
| 2008/0076432 | A1* | 3/2008 | Senarath et al. | 455/442 |
| 2009/0103494 | A1* | 4/2009 | Ma et al. | 370/331 |

FOREIGN PATENT DOCUMENTS

| WO | WO 96/01535 | 1/1996 |
|---|---|---|
| WO | WO 2004/039027 | 5/2004 |

* cited by examiner

*Primary Examiner*—Ajit Patel
(74) *Attorney, Agent, or Firm*—The Farrell Law Firm, LLP

(57) ABSTRACT

An OFDM mobile communication system includes a system controller for dividing an OFDM symbol into a control channel and a data channel, multiplexing the control channel to control subchannels, and allocating the multiplexed control subchannels to base stations. The base stations simultaneously transmit control signals on the control allocated subchannels and data on the data channel. Mobile nodes receive an OFDM symbols with the multiplexed control channels for them and a data channel for selecting a base station according to information in the control subchannels. The mobile node simultaneously processes control subchannels received from two base stations using one physical layer module.

24 Claims, 15 Drawing Sheets

US 7,729,313 B2

HANDOVER METHOD FOR OFDM WIRELESS COMMUNICATION SYSTEM

PRIORITY

This application claims priority under 35 U.S.C. §119 to an application entitled "Handover Method for OFDM Wireless Communication System" filed in the Korean Intellectual Property Office on Jun. 18, 2004 and assigned Serial No. 2004-45758, the contents of which are incorporated herein by reference.

BACKGROUND OF THE INVENTION

1. Field of the Invention

The present invention relates generally to a mobile communication system, and in particular, to a data transmission and reception method with handover in an Orthogonal Frequency Division Multiplexing (OFDM) communication system.

2. Description of the Related Art

OFDM schemes are especially suitable for high-speed data transmission. With the OFDM scheme, serial input data is converted into parallel streams as based on the number of subcarriers that are modulated, such that the symbol duration can be elongated in proportion with the number of subcarriers while maintaining the original date rate. Because subcarriers are orthogonal to each other, bandwidth efficiency of the OFDM scheme is excellent compared to the conventional Frequency Division Multiplexing (FDM) scheme. In addition, because the symbol durations are longer in the OFDM scheme, the OFDM scheme is more robust against intersymbol interference (ISI) than a single-carrier modulating scheme.

In general, modulation/demodulation of OFDM signals is executed efficiently using Inverse Fast Fourier Transform/Fast Fourier Transform (IFFT/FFT) or Inverse Discrete Cosine Transform/Discrete Cosine Transform (IDCT/DCT). However, since data modulated using IFFT in a modulation process can be restored to its original form by FFT at the reception side, the number of FFT physical layer modules should be equal to the number of base stations to enable simultaneous reception of data from base stations at different locations. In other words, since a mobile node (MN) needs a simultaneous connection to two base stations to perform soft handover, the MN includes two physical layer modules to perform FFT on the data from the two base stations.

Handovers can be roughly divided into hard handovers and soft handovers.

Hard handovers can be performed using one resource among wireless channels because the MN makes a connection to a new base station in a handover process after cutting off a connection to a previous base station. If the hard handover is used in an OFDM wideband transmission scheme, the handover can be performed using one physical layer module. However, since the currently connected channel is disconnected before handover to the new base station, quality of service (QoS) cannot be guaranteed. Because one data channel and one control channel are occupied in the hard handover, the switching time is long, and since the handover window is designed large to prevent a ping-pong effect between base stations, high power is consumed to transmit data, which increases inter channel interference (ICI). Further, because of the physical channel disconnection effect, the hard handover is not suitable for real-time services.

Unlike the hard handover, in the soft handover, an MN can be simultaneously connected to a plurality of base stations if pilot signal size is within a predetermined window. The MN selects data received from a base station of which a pilot signal has a higher signal-to-noise ratio (SNR). The soft handover provides better QoS guarantee in low-speed real-time data transmission services such as a voice service. However, because two data channels and two control channels are used to perform the soft handover, interference from use of two data channels may occur. Accordingly, the soft handover is suitable for low-speed real-time data such as voice. However, the soft handover has limitations in supporting high-speed data services such as multimedia services, e.g., video on demand (VOD).

FIG. 1 is a diagram illustrating handover in a conventional Universal Mobile Telecommunication System (UMTS) system. Referring to FIG. 1, the UMTS system includes node-Bs 103a, 103b, 103c, and 103d, one a base station, and radio network controllers (RNCs) 105a and 105b controlling the node-Bs 103a, 103b, 103c, and 103d. A UMTS Terrestrial Radio Access Network (UTRAN) 107 composed of the RNCs 105a and 105b is connected to a core network (CN) 109 using an Iu interface. Each of the RNCs 105a and 105b selects a node-B 103a, 103b, 103c, or 103d with a higher SNR using an MN 101 and designated channels.

In FIG. 1, the MN 101 receives packets from the main node-B 103c. As the MN 101 moves closer to the cell border between the main node-B 103c and the sub node-B 103b, the MN 101 senses a pilot signal from the sub node-B 103b getting stronger. When the pilot signal received from the sub node-B 103b exceeds a predetermined threshold, the MN 101 receives packets from the main node-B 103c and the sub node-B 103b simultaneously.

The handover algorithm resides in the RNCs 105a and 105b and the MN 101, and is achieved by signaling between the MN 101 and the RNCs 105a and 105b. The node-Bs 103a, 103b, 103c, and 103d act as a bridge for transmitting signals from the RNCs 105a and 105b to the MN 101.

Since data is modulated/demodulated using IFFT/FFT in an OFDM data transmission/reception scheme, MNs commonly uses two physical layer modules to receive data from different radio access routers (RARs). A system for supporting mobility of an MN using two physical layer modules is disclosed in International Publication No. WO 03/017689.

FIG. 2 is a block diagram illustrating a multiple connection method for supporting mobility of an MN in a conventional OFDM system. FIG. 3 is a block diagram illustrating an MN structure for multiple connections.

Referring to FIG. 2, an MN 302 maintains connections 410 and 414 with first and second base stations 304 and 306, respectively. The connections 410 and 414 include uploading control links 408 and 412, downloading control links 409 and 413, uploading data links 416 and 418, and downloading data links 417 and 419, respectively. Referring to FIG. 3, in order to maintain connections with two base stations, an MN 900 includes an analog processing module 902, an analog-to-digital (A/D) converter 904, a copy module 906, a pair of signal separating circuits 905 and 907, a pair of synchronization loops 908 and 909, and a pair of main digital processing modules 912 and 914.

It is readily apparent that conventional MNs supporting multiple connections, because two physical layer modules are used to support mobility have more complex hardware, increasing manufacturing costs.

SUMMARY OF THE INVENTION

An object of the present invention is to substantially solve at least the above problems and/or disadvantages and to provide at least the advantages below. Accordingly, an object of the present invention is to provide a handover method for supporting mobility of a mobile node (MN) by connecting the MN with at least two base stations using one physical layer module.

Another object of the present invention is to provide a handover method for improving resource efficiency by switching an MN that occupies two control channels and one data channel, between two base stations.

A further object of the present invention is to provide a handover method for reducing channel noise by using one data channel for switching.

A further object of the present invention is to provide a handover method for reducing channel occupancy and maximizing space diversity.

The above objects are achieved by providing a handover method that enables an MN to occupy two control channels and one data channel of at least two base stations simultaneously using one physical layer module.

According to one aspect of the present invention, a resource allocation method of a multicarrier wireless communication system including a plurality of base stations transmitting data to mobile nodes through an entire system frequency band includes steps of dividing the entire system frequency band into a control band and a data band; and multiplexing the control band to control channels and allocating the multiplexed control channels to the base stations.

According to another aspect of the present invention, a data transmission method of a base station in a multicarrier wireless communication system including a plurality of base stations transmitting data to mobile nodes through an entire system frequency band includes the steps of dividing the entire system frequency band into a control band and a data band, and receiving one allocated control channel among control channels generated by multiplexing the control band; and simultaneously transmitting a control signal and data by carrying the control signal on the control channel and the data on the data band.

According to another aspect of the present invention, a data reception method of a mobile node in a multicarrier wireless communication system including a plurality of base stations transmitting data to mobile nodes through an entire system frequency band includes the steps of receiving signals of the entire system frequency band including a control band multiplexed to control channels for respective base stations and a data band shared by all of the base stations; and selecting a base station to which the mobile node is to be connected according to information included in the control channels for respective base stations of the control band, and receiving data from the selected base station.

According to another aspect of the present invention, a handover method of a multicarrier wireless communication system including a plurality of base stations transmitting data to mobile nodes through an entire system frequency band includes the steps of receiving signals of the entire system frequency band including a control band multiplexed to control channels for respective base stations and a data band shared by all of the base stations; simultaneously processing the control channels included in the control band; selecting a base station according to the control channel process results; and receiving data from the selected base station via the data channel. Preferably, the control channels include pilot signals.

According to one aspect of the present invention, a resource allocation method of an OFDM wireless communication system includes the steps of dividing an OFDM symbol duration into a control channel and a data channel; and multiplexing the control channel to a plurality of control subchannels and allocating the multiplexed control subchannels to base stations. Preferably, the control channel is multiplexed using FDM or CDM.

According to another aspect of the present invention, a data transmission method of a base station in an OFDM wireless communication system includes the steps of dividing an OFDM symbol duration into a control channel and a data channel, and receiving one allocated control subchannel among control subchannels generated by multiplexing the control band; and simultaneously transmitting a control signal and data by carrying the control signal on the allocated control subchannel and the data on the data channel.

According to another aspect of the present invention, a data reception method of a mobile node in an OFDM wireless communication system includes the steps of receiving an OFDM symbol including a control channel multiplexed to control subchannels for respective base stations and a data channel shared by all of the base stations; and selecting a base station to which the mobile node is to be connected according to information included in the control subchannels for respective base stations of the control channel, and receiving data from the selected base station.

According to another aspect of the present invention, a mobile node of a multicarrier wireless communication system including a plurality of base stations transmitting data to mobile nodes through an entire system frequency band includes a synchronization module for receiving signals of the entire system frequency band including a control band multiplexed to control channels for respective base stations and a data band shared by all of the base stations and performing timing synchronization on the received signals; a demodulation module for simultaneously demodulating the signals synchronized by the synchronization module; a detection module for detecting the control channels for respective base stations from the signals demodulated by the demodulation module; a selection module for selecting a base station according to the control channels for respective base stations detected by the detection module; and a decoding module for restoring data from the base station selected by the selection module via the data channel. Preferably, the control band is multiplexed using FDM or CDM and the demodulation module is a fast Fourier transformer.

According to another aspect of the present invention, an OFDM mobile communication system includes a system controller for dividing an OFDM symbol into a control channel and a data channel, multiplexing the control channel to a plurality of control subchannels, and allocating the multiplexed control subchannels to base stations; a plurality of base stations for having allocated the control subchannels and simultaneously transmitting own control signals and data by carrying the own control signals on the control subchannels and the data on the data channel; and a plurality of mobile nodes for receiving an OFDM symbol including a control channel multiplexed to control channels for respective base stations and a data channel shared by all of the base stations and for selecting a base station to be connected according to information included in the control subchannels. Preferably, each base stations includes an inverse fast Fourier transformer for generating an OFDM symbol by modulating the control signal and the data. It is further preferred that each mobile node includes a physical layer module for simultaneously processing OFDM symbols received from the base stations and the physical layer module is a fast Fourier transformer.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

According to an embodiment of the present invention, communication system resources are used more efficiently by using one data channel when the handover is performed between two base stations and by maintaining connections with two base stations simultaneously using two control channels.

Figure 1:
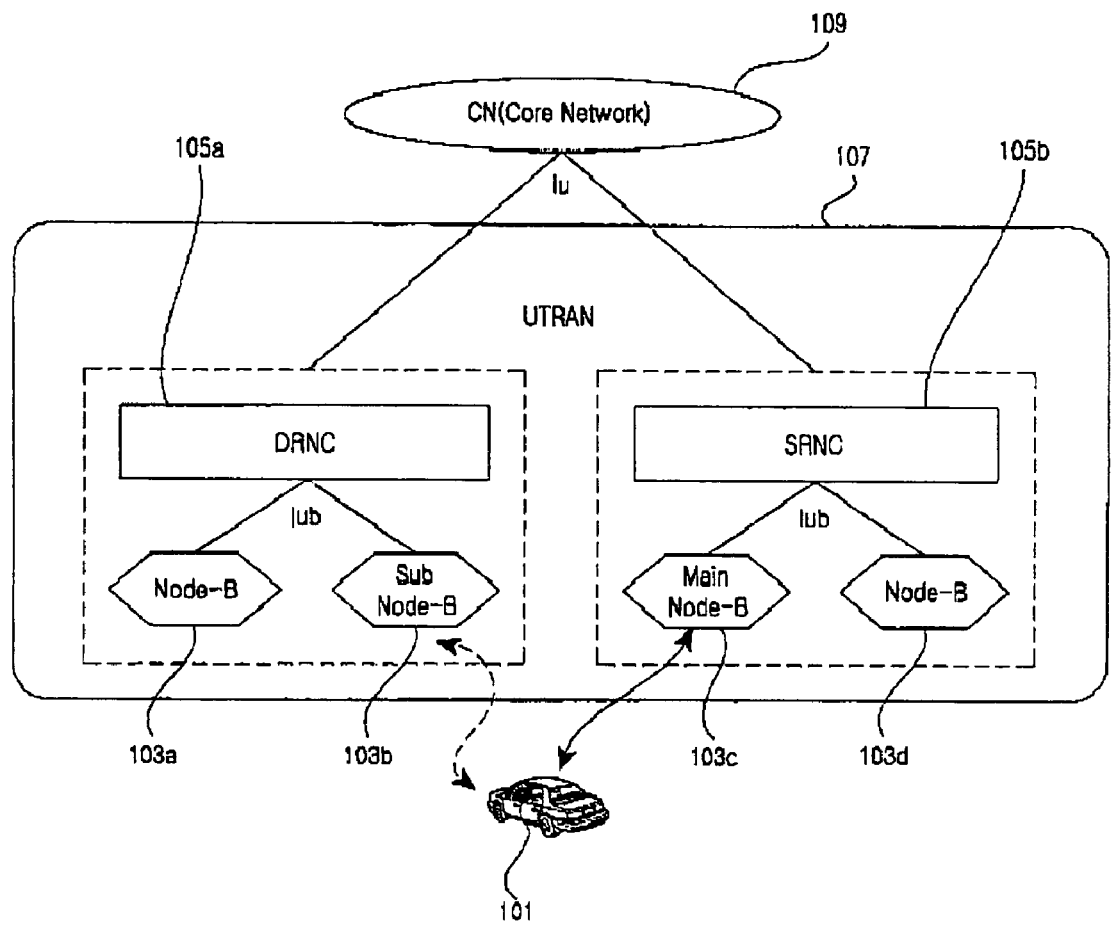
FIG. 1 is a diagram illustrating handover in a conventional UMTS system.
Figure 2:
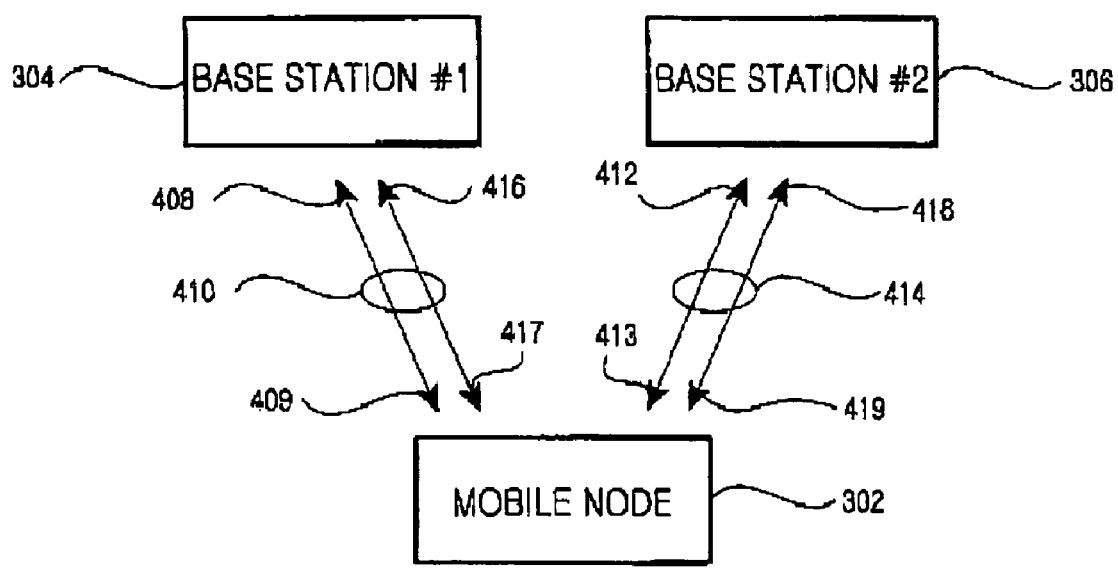
FIG. 2 is a block diagram illustrating a multiple connection method for supporting MN mobility in a conventional OFDM system.
Figure 3:
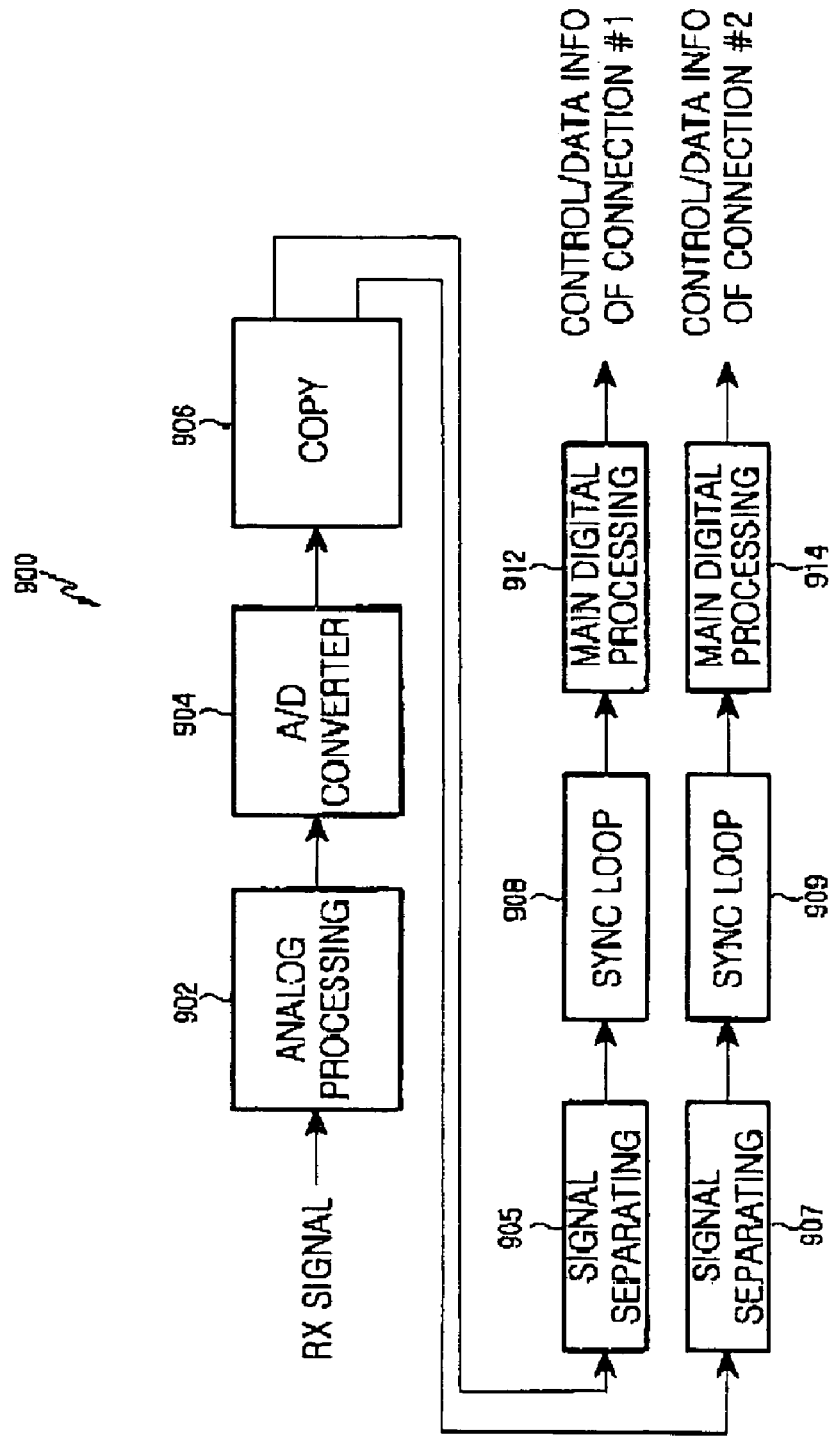
FIG. 3 is a block diagram illustrating a MN structure for multiple connections in a conventional OFDM system.
Figure 4:
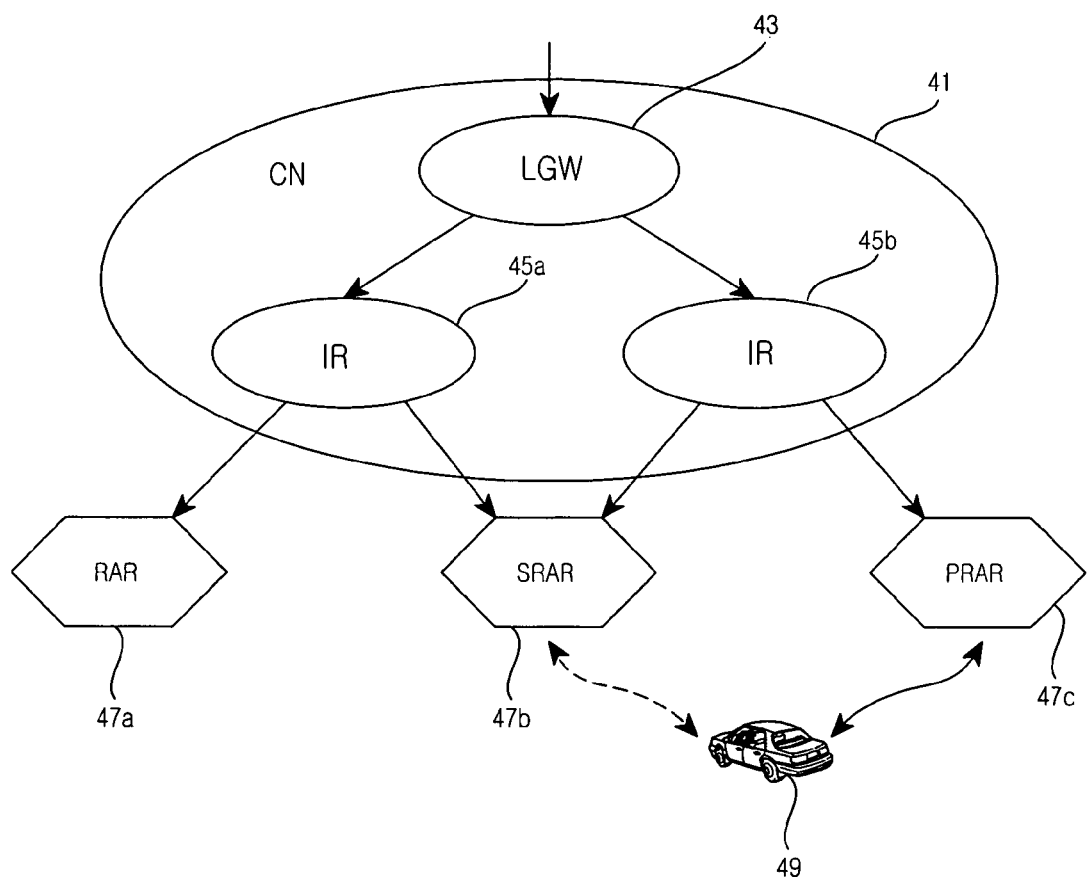
FIG. 4 is a schematic block diagram illustrating a structure of a $4^{th}$ generation (4G) network based on Mobile IP to which a preferred embodiment of the present invention is applied.

FIG. 4 is a schematic block diagram illustrating a structure of a $4^{th}$ generation (4G) network based on Mobile IP to which a preferred embodiment of the present invention is applied. Referring to FIG. 4, a core network (CN) 41 includes intermediate routers (IRs) 45a and 45b, which support MN mobility based on an IP (Internet Protocol), and a local gateway (LGW) 43. The CN 41 is connected to external networks, such as the Internet, through the LGW 43. Each IR 45a and 45b is connected to specific radio access routers (RARs) 47a, 47b and 47c, and provides services to MNs located in its respective service area. Each of the RARs 47a, 47b and 47c functions like an integrated RNC and BTS (Base station Transceiver Subsystem) in a $3^{rd}$ generation (3G) network.

Figure 5:
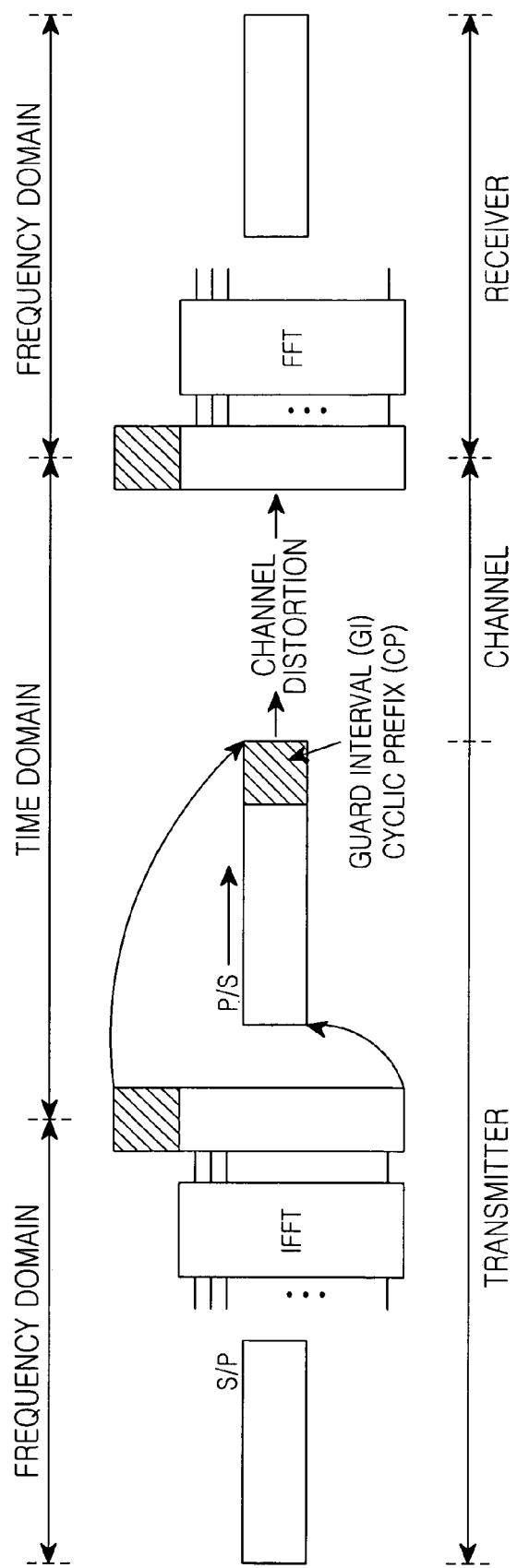
FIG. 5 is a conceptual diagram illustrating data transmission/reception in an OFDM system.

FIG. 5 is a conceptual diagram illustrating data transmission and reception in an OFDM system. Referring to FIG. 5, an input signal is converted into a plurality of parallel symbols by serial-to-parallel conversion, and the converted parallel symbols are carried on subcarriers by IFFT. The IFFT-processed symbols, into which a guard interval (GI) is inserted after the IFFT-processed parallel symbols are multiplexed in a time domain, are then transmitted over a wireless channel. In the receiver, after the GI is removed from the signal, the signal is restored to the parallel symbols by FFT, and the parallel symbols are restored to the original data by parallel-to-serial conversion.

Figure 6:
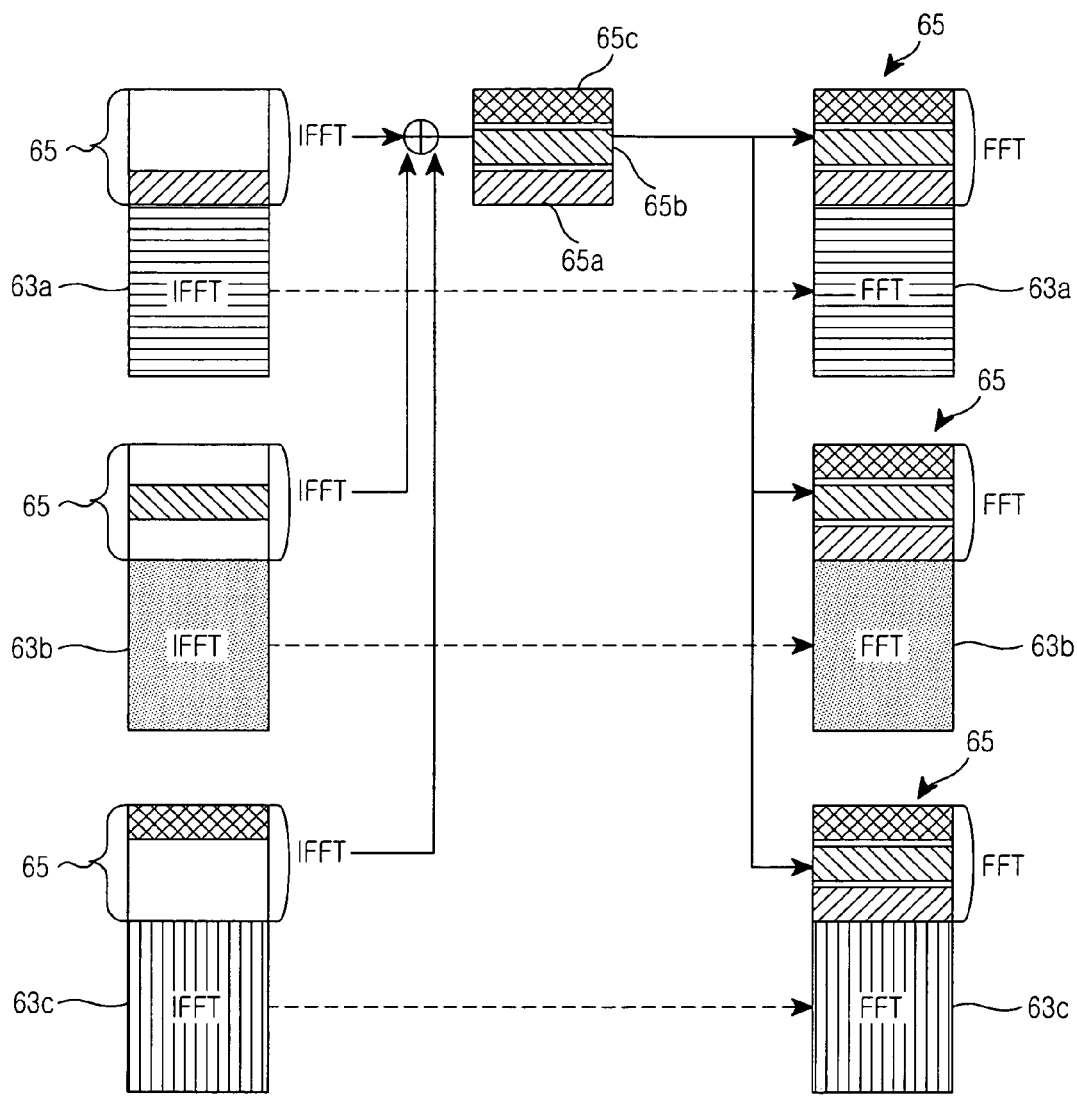
FIG. 6 is a conceptual diagram illustrating a data format for handover in an OFDM system according to a preferred embodiment of the present invention.

FIG. 6 is a conceptual diagram illustrating a data format for handover in an OFDM system according to a preferred embodiment of the present invention. Referring to FIG. 6, bandwidth of a downlink is divided into two parts to realize semi-soft handover according to an embodiment of the present embodiment. One part includes dedicated data bands 63a, 63b and 63c for transmitting data, the other part is a dedicated control band 65 used for a sync channel (SCH), a broadcast channel (BCH), a common pilot channel (CPICH), and a semi-soft-handover control channel (SSHCCH).

Three RARs transmit data to three MNs. In this case, the RARs transmit data through the dedicated data bands 63a, 63b and 63c. At the same time, the RARs transmit a control signal including a signal for supporting handover through the dedicated control band 65. The dedicated control band 65 is divided and allocated to control channels 65a, 65b and 65c of the three MNs.

In other words, the RARs are distinguished from each other by the unique control channels 65a, 65b and 65c allocated thereto. In each RAR, a portion of the dedicated control band 65, except for its own control channel is zero-padded, and the control channels 65a, 65b and 65c of the RARs are multiplexed and transmitted to the MNs. Each MN receives data from their associated base stations via the dedicated data bands 63a, 63b and 63c by decoding control channels transmitted thereto.

Here, the dedicated control band 65 can be multiplexed using an FDM technique or a CDM technique.

Although three base stations communicate with three MNs in this example, the numbers of base stations and MNs in a system according to an embodiment of the present invention are not limited and can be changed according to systems and channel environments.

Figure 7:
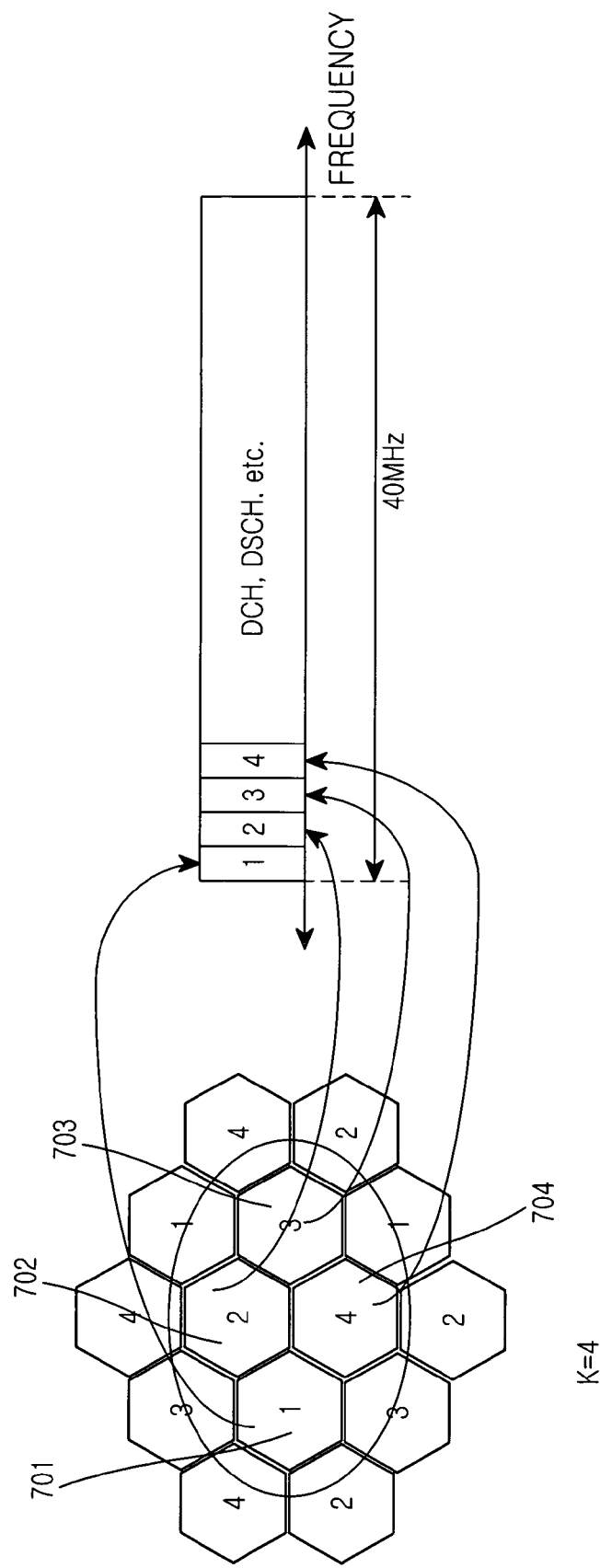
FIGS. 7 and 8 are conceptual diagrams illustrating control channel allocation of a dedicated control band for handover according to a preferred embodiment of the present invention.
Figure 8:
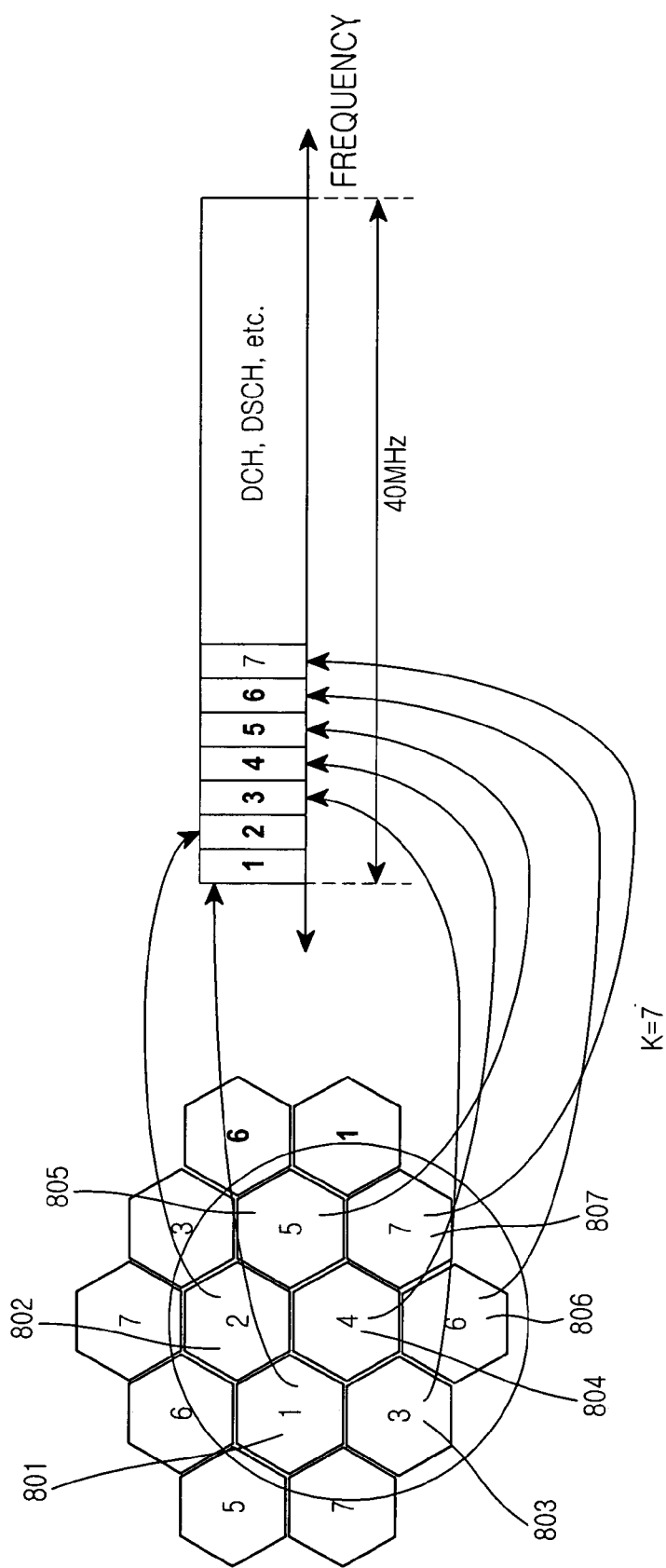

FIGS. 7 and 8 are conceptual diagrams illustrating control channel allocation of a dedicated control band for handover according to a preferred embodiment of the present invention. In FIG. 7, a, frequency reuse factor of K=4 is provided as an example. The dedicated control band is divided into four control channels, and the 4 control channels are allocated one by one to cells 701, 702, 703, and 704 which use independent frequencies. Base stations in the cells transmit control signals to MNs by carrying control signals on independent subcarriers, and zero-pad the remaining portion of the dedicated control band. Therefore, each of the MNs can simultaneously analyze synchronization and broadcast signals transmitted from a plurality of base stations. The frequency reuse concept of cellular systems is preferably adopted to prevent control signal bands from overlapping.

In the example of FIG. 8, a frequency reuse factor K=7 is used. The dedicated control band is divided into seven control channels, and the seven control channels are allocated one by one to cells 801, 802, 803, 804, 805, 806 and 807, which use independent frequencies.

Figure 9:
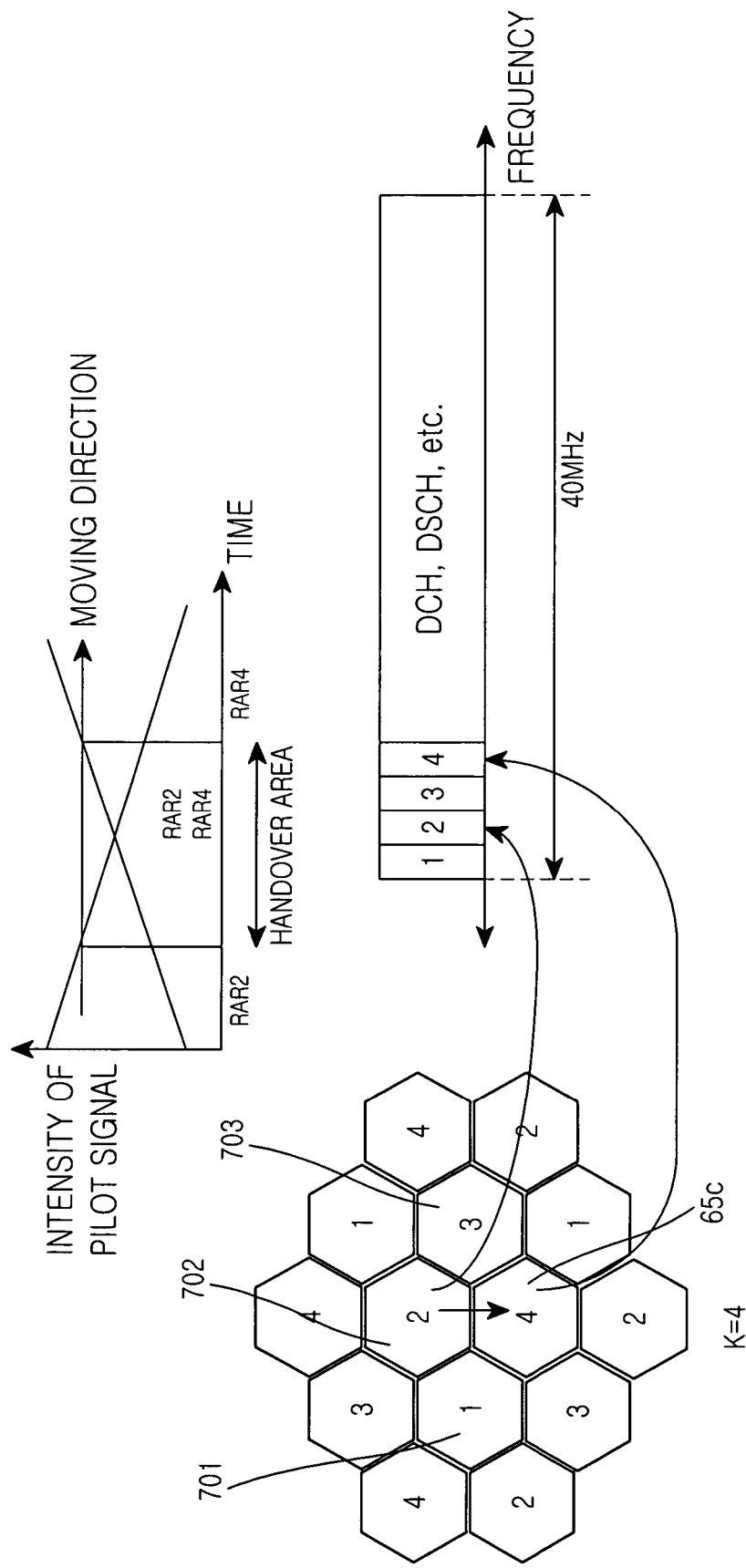
FIG. 9 is a conceptual diagram illustrating a procedure in which a mobile node determines handover using control channels received from two base stations in the system illustrated in FIG. 7.

FIG. 9 is a conceptual diagram illustrating a procedure in which an MN determines handover using control channels received from two base stations in the system illustrated in FIG. 7.

Referring to FIG. 9, the MN is moving from a cell#2 702 to a cell#4 704. The MN measures and analyzes strengths of pilot signals of the cell#2 702 and the cell#4 704 received via the dedicated control band and determines which cell it will receive data from according to the measured strength of the pilot signals. Since the strength of the pilot signal of the cell#4 704 gradually increases, the MN performs handover from an RAR of the cell#2 702 to an RAR of the cell#4 704.

Figure 10:
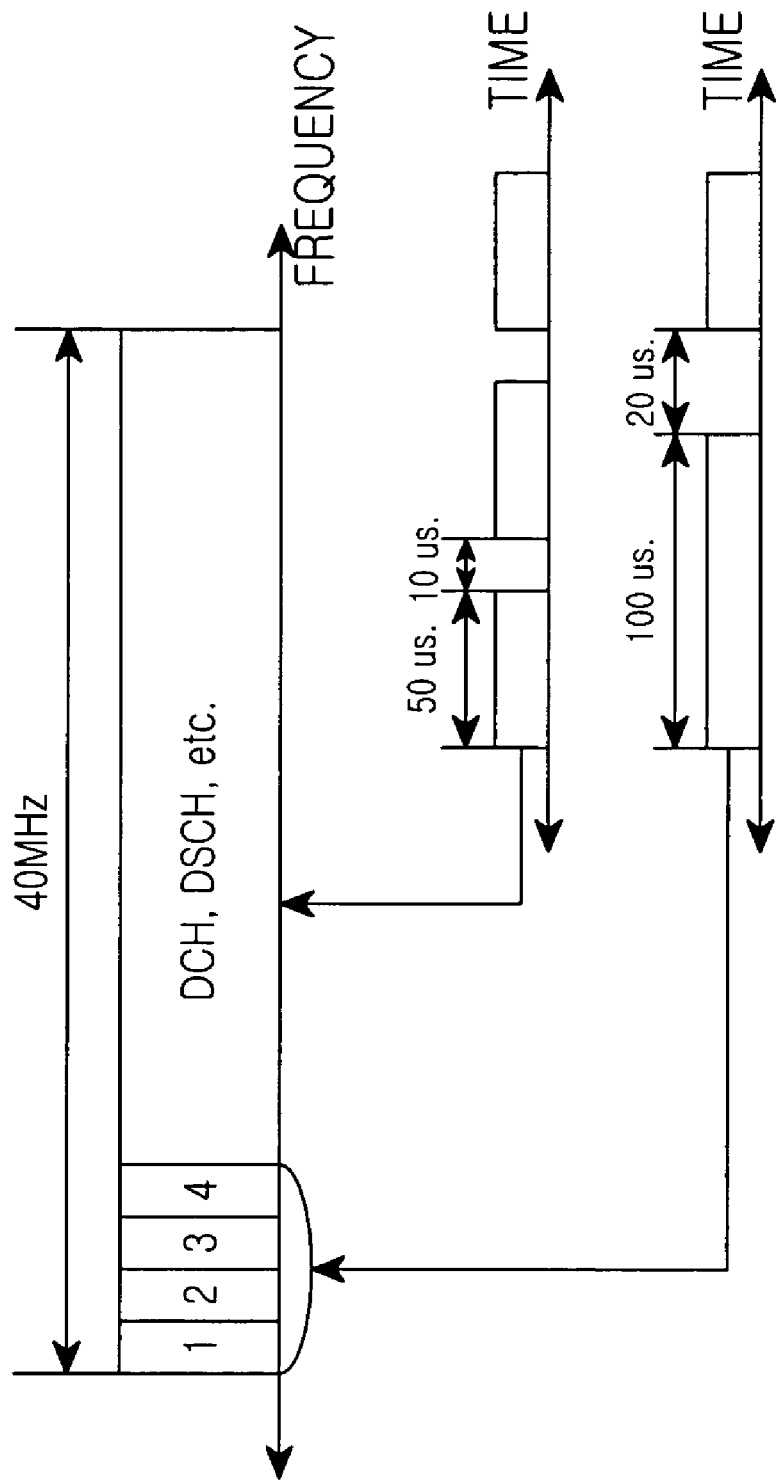
FIG. 10 illustrates a timing synchronization method for simultaneously receiving signals transmitted from different RARs in a handover method according to a preferred embodiment of the present invention.

FIG. 10 illustrates a timing synchronization method for simultaneously receiving signals transmitted from different RARs in a handover method according to a preferred embodiment of the present invention. Referring to FIG. 10, in the handover method, a symbol duration and a GI of a control channel are set relatively long compared to the symbol duration and GI of the data channel. It should be noted that lengths of the symbol durations and GIs can be adjusted according to synchronization performance of the physical layer. To match periodic synchronization of the two channels, time periods of the symbol duration and GI of the control channel are set to multiples of time periods of the symbol duration and GI of the data channel. Even if, in this example, the time periods of the symbol duration and GI of the control channel are set to two times that of the data channel, time periods can be designed in a different way according to the synchronization methods implemented.

Figure 11:
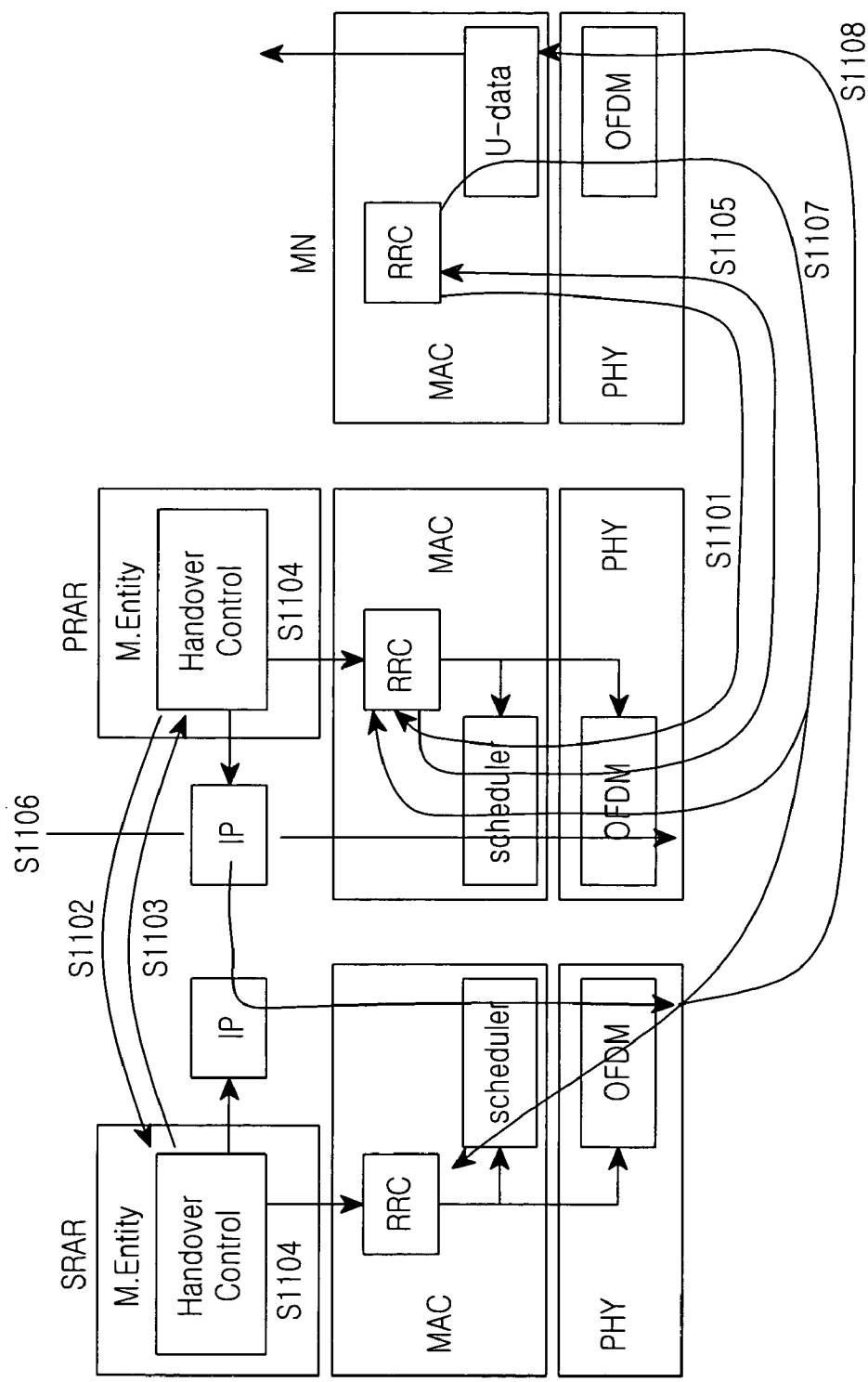
FIG. 11 is a schematic diagram illustrating a signal transferring procedure in a handover method according to a preferred embodiment of the present invention.

FIG. 11 is a schematic diagram illustrating a signal transferring procedure in a handover method according to a preferred embodiment of the present invention. Referring to FIG. 11, an MN transmits information on a secondary RAR (SRAR) to a primary RAR (PRAR) in step S1101. The PRAR sends a handover initialization request to the SRAR in step S1102. The SRAR, transmits an ACK message to the PRAR in response to the handover initialization request in step S1103 and sets up a data channel for handover in step S1104. When the PRAR receives the ACK message, the PRAR informs the MN that the handover is ready in step S1105 and transmits a duplicate of a packet received via a CN to the SRAR in step S1106. At this point, the PRAR and the SRAR temporarily store the same packet in their own buffers.

The MN measures strength of pilot signals received from the PRAR and the SRAR, selects the RAR with greater pilot signal strength, and informs the PRAR and the SRAR of the selection in step S1107. At this point, a signal for handover decision is transmitted from a radio resource controller (RRC) of the MN to RRCs of the PRAR and the SRAR. After the handover decision is made, the selected SRAR transmits the duplicate of the packet received from the PRAR to the MN in step S1108.

FIGS. 12 through 15 illustrate a procedure of selecting an RAR in real-time based on pilot signal strength in a handover method according to a preferred embodiment of the present invention.

Figure 12:
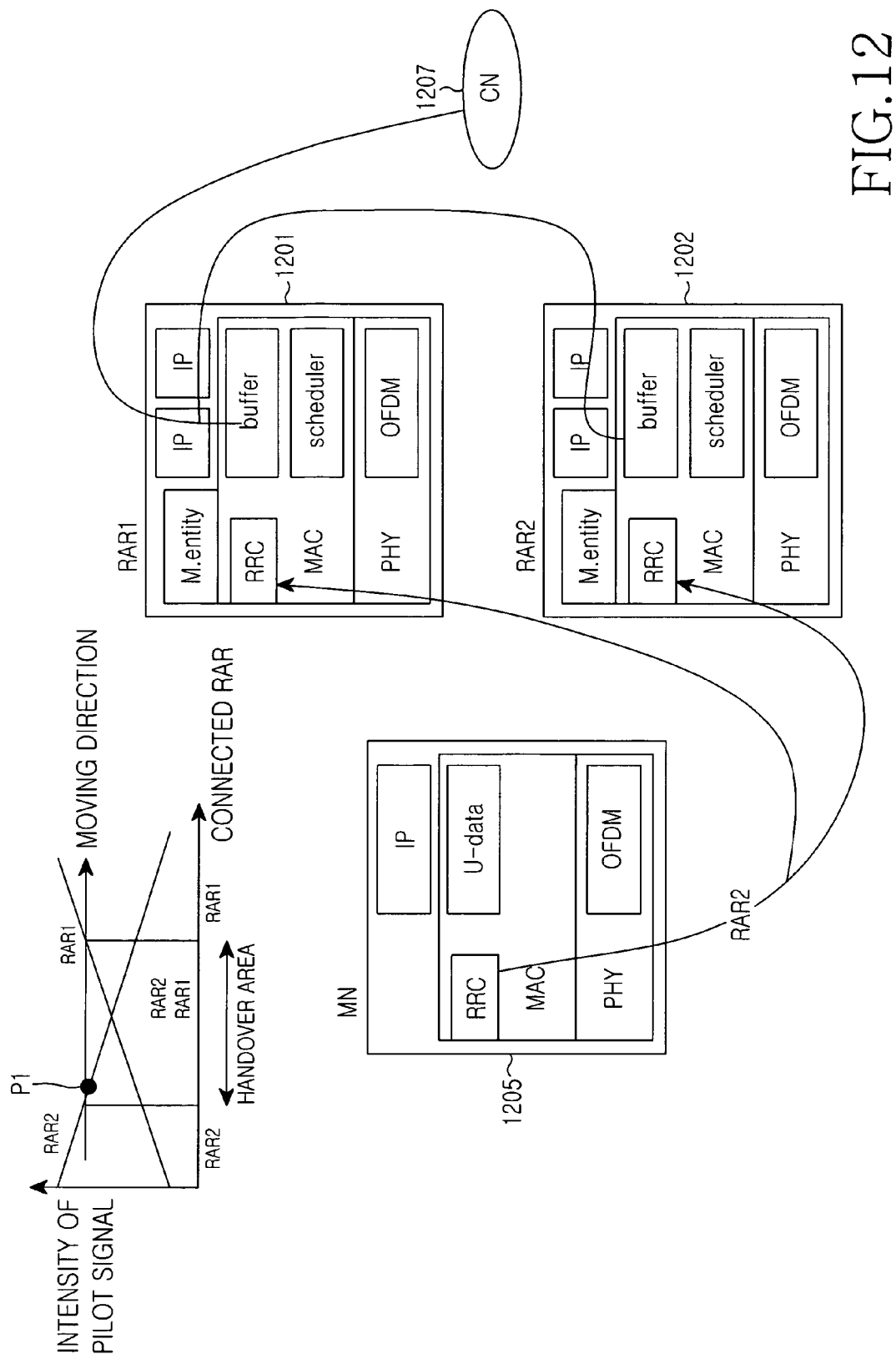
FIGS. 12 through 15 illustrate a procedure of selecting an RAR from which data is transmitted in real-time based on intensity of received pilot signals in a handover method according to a preferred embodiment of the present invention.
Figure 13:
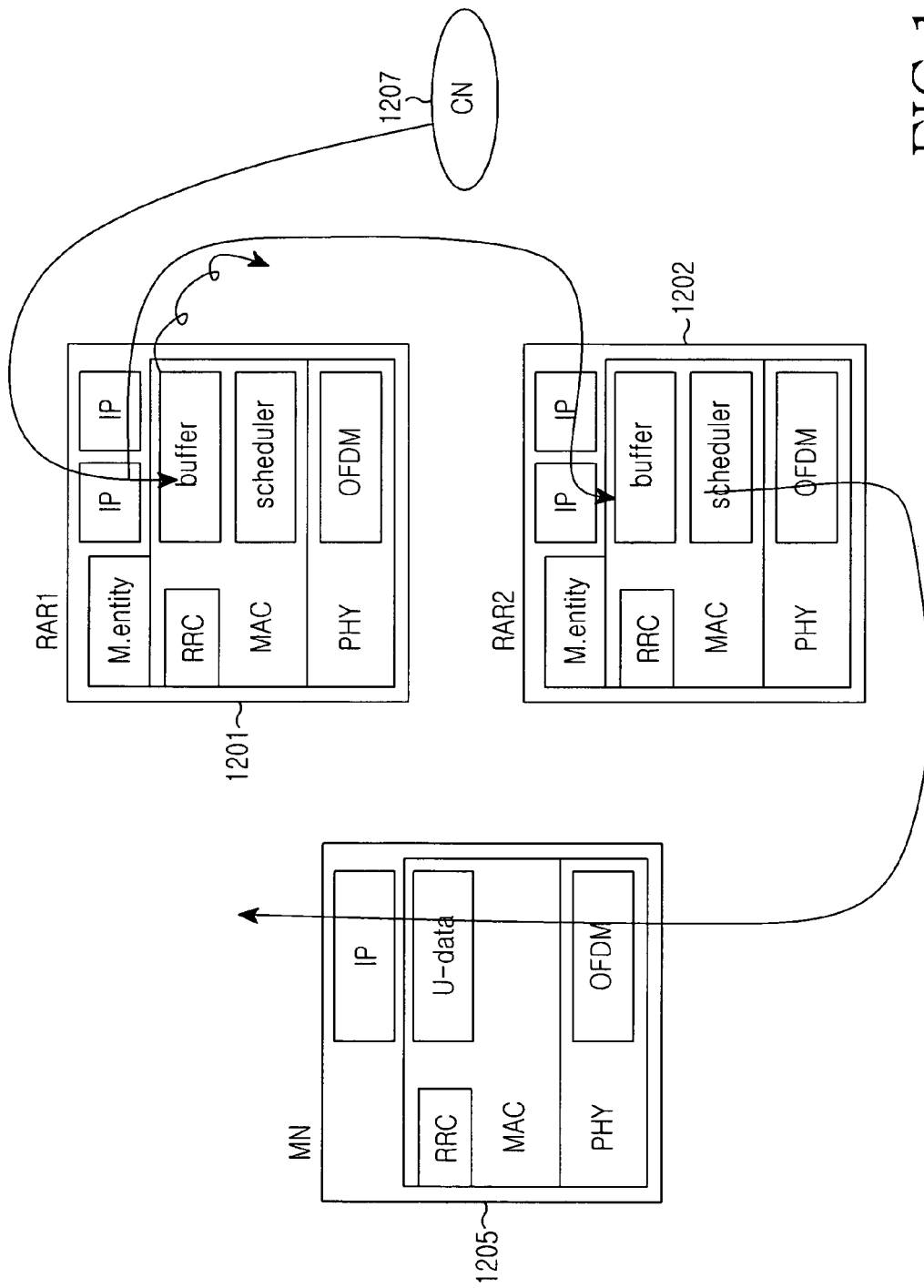

Referring to FIG. 12, an MN 1205 is moving from an RAR2 1202 to an RAR1 1201. Since the RAR2 1202 pilot signal is stronger than that of the RAR1 1201 at time P1, the MN 1205 selects the RAR2 1202 as a serving RAR. Once the signal transferring procedure illustrated in FIG. 11 has finished, packets from a CN 1207 are simultaneously transmitted to the RAR1 1201 and the RAR2 1202.

The MN 1205 informs the RAR1 1201 and the RAR2 1202 that the RAR2 1202 has been selected as the serving RAR at time P1. When the RAR2 1202 receives the selection result message from the MN 1205, the RAR2 1202 transmits the packets from the CN 1207 to the MN 1205. [Here, although the RAR1 1201 maintains allocated wireless channel resources, the RAR1 1201 discards the packets buffered to be transmitted to the MN 1205 (refer to FIG. 13).

Figure 14:
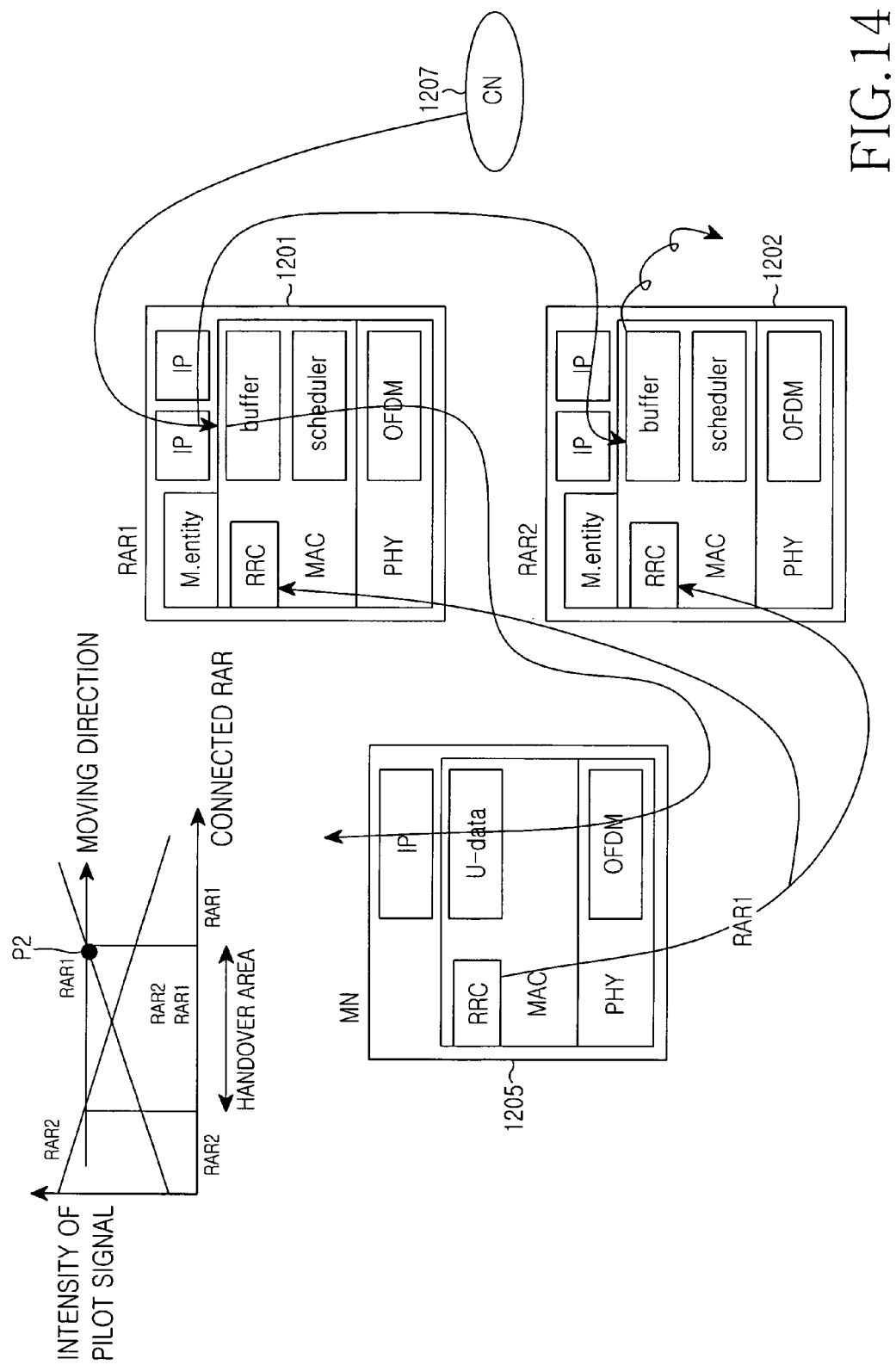
Figure 15:
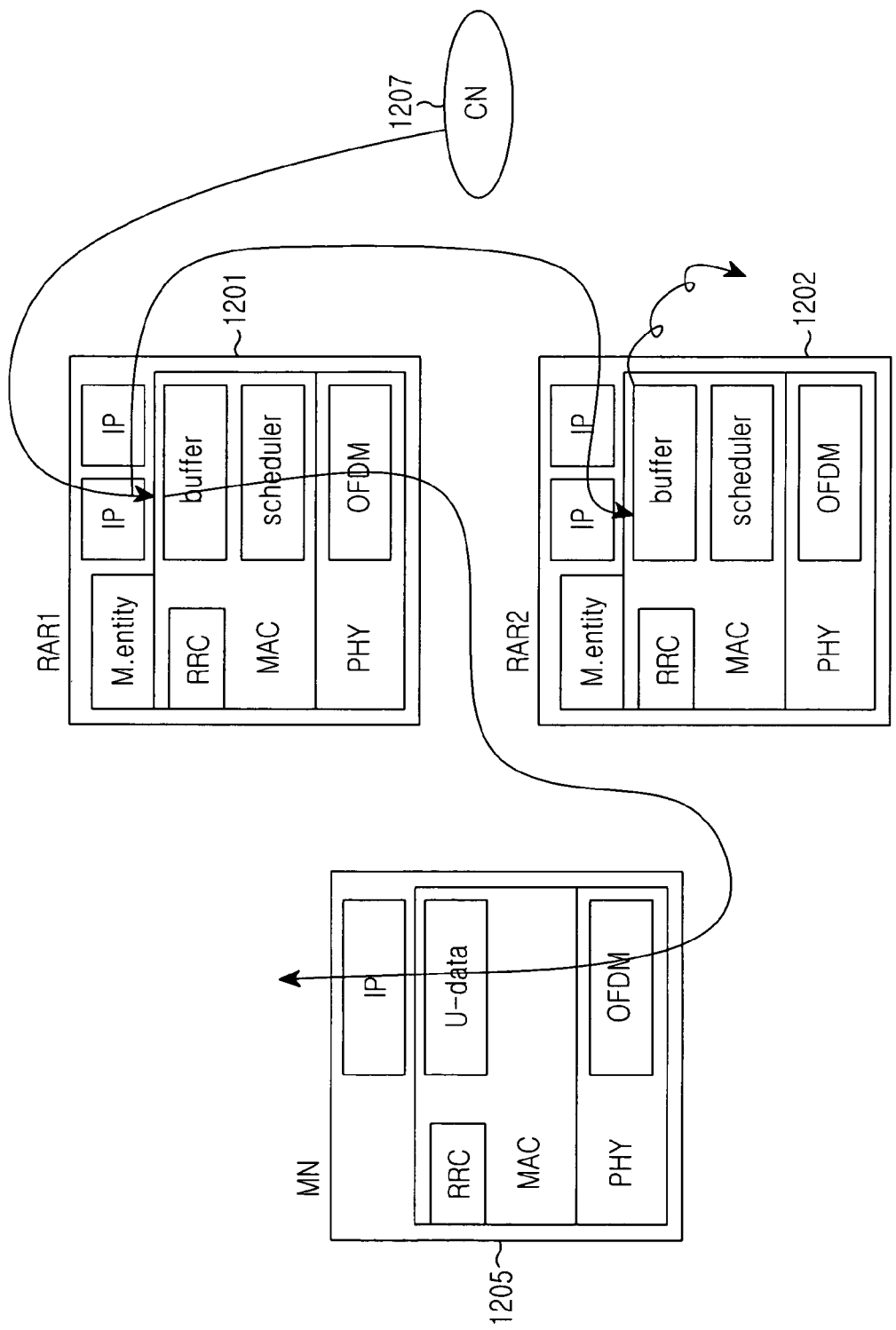

Referring to FIG. 14, when the MN 1205 is getting close to the RAR1 1201, since the RAR1 1201 pilot signal is stronger than that of the pilot signal from the RAR2 1202 at time P2, the MN 1205 selects the RAR1 1201 as the serving RAR. When the serving RAR is changed, MN 1205 informs the RAR1 1201 and the RAR2 1202 that the RAR1 1201 has been selected as the serving RAR at the time P2. When the RAR1 1201 receives notification from the MN 1205, the RAR1 1201 transmits the packets from the CN 1207 to the MN 1205. When the RAR2 1202 receives the selection result message, the RAR2 1202 maintains an idle channel allocated to the MN 1205 and discards the packets from the CN 1207 (refer to FIG. 15).

As described above, in the inventive handover methods, handover of a mobile node is supported using one physical layer module in an OFDM wireless communication system. Thus, channel efficiency is improved, and manufacturing costs of mobile nodes are reduced.

Also, in the inventive handover methods, handover is quickly performed without data loss even if only one data channel is used for switching. Thus, channel occupancy is reduced, and space diversity is maximized.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A handover method of a mobile node in a wireless communication system including a plurality of base stations, the method comprising:
   receiving signals of an entire system frequency band including a dedicated control band and a dedicated data band, the dedicated control band being divided into a plurality of unique control channels, each of the plurality of unique control channels being allocated to each of the plurality of base stations and the dedicated data hand being occupied by all of the plurality of base stations; and
   selecting a handover-target base station from among the plurality of base stations, based on at least two pilot signals transmitted on at least two of the plurality of unique control channels,
   wherein a number of the unique control channels is determined based on a frequency reuse factor, and
   wherein time periods of symbol durations and guard interval durations of the unique control channels are set to multiples of time periods of a symbol duration and a guard interval duration of a data channel included in the dedicated data band.

2. The method of claim 1, wherein selecting the handover-target base station comprises:
   measuring an intensity of each of the at least two pilot signals; and
   selecting a base station transmitting a pilot signal with a highest intensity among the at least two pilot signals as the handover-target base station.

3. The method of claim 2, wherein selecting the handover-target base station comprises:
comparing the intensity of each of the at least two pilot signals with a predetermined threshold;
registering base stations transmitting a pilot signal with an intensity greater than the predetermined threshold as handover candidate base stations;
determining if an intensity of a pilot signal from a currently connected base station is within a predetermined range of the predetermined threshold;
selecting one of the handover candidate base stations as the handover-target base station, when the intensity of the pilot signal from the currently connected base station is within the predetermined range of the predetermined threshold; and
transmitting a handover initialization request to the currently connected base station and the handover-target base station.

4. The method of claim 1, wherein the plurality of unique control channels are multiplexed using at least one of a Frequency Division Multiplexing (FDM) scheme and a Code Division Multiplexing (CDM) scheme.

5. A handover method of a base station in a wireless communication system including a mobile node and a plurality of base stations, the method comprising:
transmitting, to the mobile node, a control signal using a unique control channel allocated to the base station; and
transmitting, to the mobile node, data of the base station using a data channel included in a dedicated data band occupied by all of the plurality of base stations,
wherein the unique control channel is one of a plurality of unique control channels included in a dedicated control band and is used for transmitting a pilot signal to select a handover-target base station to the mobile node,
wherein a number of the unique control channels is determined based on a frequency reuse factor, and
wherein time periods of symbol durations and guard interval durations of the unique control channels are set to multiples of time periods of a symbol duration and a guard interval duration of the data channel.

6. The method of claim 5, wherein the plurality of unique control channels are multiplexed using at least one of a Frequency Division Multiplexing (FDM) scheme and a Code Division Multiplexing (CDM) scheme.

7. The method of claim 5, further comprising:
receiving duplicate data transmitted from a currently connected base station of the mobile node; and
transmitting the duplicate data to the mobile node, after being selected as the handover-target base station and receiving a handover decision message from the mobile node.

8. A handover system in a wireless communication system, comprising:
a plurality of base stations; and
a mobile node for receiving signals of an entire system frequency band including a dedicated control band and a dedicated data band, the dedicated control band being divided into a plurality of unique control channels, each of the plurality of unique control channels being allocated to each of the plurality of base stations and the dedicated data band being occupied by all of the plurality of base stations, and for selecting a handover-target base station from among the plurality of base stations, based on at least two pilot signals transmitted on at least two of the plurality of unique control channels,
wherein a number of the unique control channels is determined based on a frequency reuse factor, and
wherein time periods of symbol durations and guard interval durations of the unique control channels are set to multiples of time periods of a symbol duration and a guard interval duration of a data channel included in the dedicated data band.

9. The system of claim 8, wherein the mobile node measures an intensity of each of the at least two pilot signals and selects a base station transmitting a pilot signal with a highest intensity among the at least two pilot signals as the handover-target base station.

10. The system of claim 8, wherein the mobile node compares an intensity of each of the at least two pilot signals with a predetermined threshold, registers base stations transmitting a pilot signal with an intensity greater than the predetermined threshold as handover candidate base stations, determines if an intensity of a pilot signal from a currently connected base station is within a predetermined range of the predetermined threshold, selects one of the handover candidate base stations as the handover-target base station, when the intensity of the pilot signal from the currently connected base station is within the predetermined range of the predetermined threshold, and transmits a handover initialization request to the currently connected base station and the handover-target base station.

11. The system of claim 8, wherein the dedicated control band comprises a multiplexed band using at least one of a Frequency Division Multiplexing (FDM) scheme and a Code Division Multiplexing (CDM) scheme.

12. The system of claim 8, wherein the mobile node comprises:
a synchronization module for performing timing synchronization on the received signals of the entire system frequency band;
a demodulation module for demodulating the signals synchronized by the synchronization module;
a detection module for detecting respective unique control channels for respective base stations from the signals demodulated by the demodulation module;
a selection module for selecting the handover-target base station according to pilot signals of the unique control channels detected by the detection module; and
a decoding module for restoring data received from the handover-target base station selected by the selection module using a data channel.

13. The system of claim 12, wherein the demodulation module comprises a fast Fourier transformer.

14. The system of claim 12, wherein the demodulation module simultaneously demodulates the signals synchronized by the synchronization module.

15. A handover system in a wireless communication system, comprising:
a mobile node; and
a base station transmitting, to the mobile node, a control signal using a unique control channel allocated to the base station, and transmitting, to the mobile node, data of the base station using a data channel included in a dedicated data band occupied by all base stations of the wireless communication system,
wherein the unique control channel is one of a plurality of unique control channels included in a dedicated control band and the mobile node uses a pilot signal transmitted from the unique control signal to select a handover-target base station,
wherein a number of the unique control channels is determined based on a frequency reuse factor, and
wherein time periods of symbol durations and guard interval durations of the unique control channels are set to multiples of time periods of a symbol duration and a guard interval duration of the data channel.

16. The system of claim 15, wherein the plurality of unique control channel are multiplexed using at least one of a Frequency Division Multiplexing (FDM) scheme and a Code Division Multiplexing (CDM) scheme.

17. The system of claim 15, wherein the unique control channel is used to transmit a pilot signal.

18. The system of claim 15, wherein the base station receives duplicate data transmitted from a currently connected base station of the mobile node and transmits the duplicate data to the mobile node, when selected as the handover-target base station, after receiving a handover decision message from the mobile node.

19. The system of claim 15, further comprising a system controller for allocating a dedicated control band to each of the base stations and allocating the dedicated data band including the data channel occupied by all of the base stations.

20. The method of claim 1, wherein the dedicated control band is used for transmitting at least one of a Synch Channel (SCH), a Broadcast Channel (BCH), a Common Pilot Channel (CPICH) and a Semi-Soft-Handover Control Channel (SSHCCH), and the dedicated data band is used for transmitting data.

21. The method of claim 5, wherein the control signal includes at least one of a Synch Channel (SCH), a Broadcast Channel (BCH), a Common Pilot Channel (CPICH) and a Semi-Soft-Handover Control Channel (SSHCCH).

22. The system of claim 8, wherein the dedicated control band is used for transmitting at least one of a Synch Channel (SCH), a Broadcast Channel (BCH), a Common Pilot Channel (CPICH) and a Semi-Soft-Handover Control Channel (SSHCCH), and the dedicated data band is used for transmitting data.

23. The system of claim 15, wherein the control signal comprises at least one of
a Synch Channel (SCH);
a Broadcast Channel (BCH);
a Common Pilot Channel (CPICH); and
a Semi-Soft-Handover Control Channel (SSHCCH).

24. The method of claim 5, wherein the unique control channel is used to transmit a pilot signal from the base station to the mobile node.

* * * * *